US 12,375,568 B1

United States Patent
Khermosh et al.

(10) Patent No.: US 12,375,568 B1
(45) Date of Patent: Jul. 29, 2025

(54) COMMUNICATION PROTOCOL FOR ACCELERATING ARTIFICIAL INTELLIGENCE PROCESSING TASKS OVER NON-VOLATILE MEMORY EXPRESS PROTOCOL

(71) Applicant: NeuReality Ltd., Caesarea (IL)

(72) Inventors: Lior Khermosh, Givatayim (IL); Amit Radzi, Ramat Gan (IL); Moshe Tanach, Bet Herut (IL); Yossi Kasus, Haifa (IL)

(73) Assignee: NeuReality Ltd., Caesarea (IL)

( * ) Notice: Subject to any disclaimer, the term of this patent is extended or adjusted under 35 U.S.C. 154(b) by 251 days.

(21) Appl. No.: 17/936,578

(22) Filed: Sep. 29, 2022

Related U.S. Application Data

(63) Continuation-in-part of application No. 17/387,536, filed on Jul. 28, 2021, now Pat. No. 11,570,257.

(60) Provisional application No. 63/249,712, filed on Sep. 29, 2021, provisional application No. 63/070,054, filed on Aug. 25, 2020.

(51) Int. Cl.
*H04L 67/141* (2022.01)
*H04L 61/2592* (2022.01)
*H04L 69/16* (2022.01)

(52) U.S. Cl.
CPC ........ *H04L 67/141* (2013.01); *H04L 61/2592* (2013.01); *H04L 69/16* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 8,621,627 B1 | 12/2013 | Eiriksson et al. | |
| 11,250,336 B2 | 2/2022 | Bernat et al. | |
| 2009/0064291 A1* | 3/2009 | Wahl | H04L 63/0815 726/5 |
| 2015/0012735 A1* | 1/2015 | Tamir | H04L 67/34 713/2 |
| 2017/0286363 A1* | 10/2017 | Joshua | G06F 3/0688 |
| 2018/0288090 A1* | 10/2018 | Olarig | H04L 63/1458 |
| 2020/0089532 A1* | 3/2020 | Shimamura | G06F 9/4881 |
| 2020/0117525 A1* | 4/2020 | Kachare | G06F 9/547 |
| 2020/0136972 A1 | 4/2020 | Nguyen et al. | |
| 2020/0219007 A1 | 7/2020 | Byers et al. | |
| 2021/0011863 A1 | 1/2021 | Zhang et al. | |
| 2021/0116907 A1* | 4/2021 | Altman | G08C 17/02 |
| 2021/0258405 A1* | 8/2021 | Chourasia | H04L 67/02 |
| 2021/0334542 A1 | 10/2021 | Shankar et al. | |

OTHER PUBLICATIONS

"NVM Express Over Fabrics Revision 1.1a". NVM Express. Jul. 12, 2021.

* cited by examiner

*Primary Examiner* — Lance Leonard Barry
(74) *Attorney, Agent, or Firm* — M&B IP Analysts, LLC

(57) ABSTRACT

A method and system for data transport of artificial intelligence (AI) tasks between AI resources are provided. The method includes establishing a connection between an AI client and an AI server with a storage element capabilities; encapsulating a request to process an AI task in a command capsule compliant with a storage data transfer protocol, wherein the command capsule is encapsulated at the AI client; and transporting the command capsule to an AI server over a transport link using the storage data transfer protocol.

17 Claims, 5 Drawing Sheets

COMMUNICATION PROTOCOL FOR ACCELERATING ARTIFICIAL INTELLIGENCE PROCESSING TASKS OVER NON-VOLATILE MEMORY EXPRESS PROTOCOL

CROSS-REFERENCE TO RELATED APPLICATIONS

This application claims the benefit of U.S. Provisional Application No. 63/249,712 filed on Sep. 29, 2021. This application is also a continuation-in-part of U.S. patent application Ser. No. 17/387,536, filed Jul. 28, 2021. The Ser. No. 17/387,536 application claims the benefit of U.S. Provisional Application No. 63/070,054 filed Aug. 25, 2020. The contents of the above-mentioned applications are assigned to the common assignee, and the contents of which are hereby incorporated by reference.

TECHNICAL FIELD

The disclosure generally relates to communications network access and the acceleration of the processing of AI tasks within a network environment.

BACKGROUND

The demand and need for efficient AI processing systems in terms of AI computing performance, power, and cost are increasing. These needs and demands are due in part to the increased popularity of machine learning and AI applications. The execution of such applications is performed by servers configured as dedicated AI servers or AI appliances, including software and hardware. The software may be, for example, TensorFlow®, Caffe, Pytorch®, or CNTK®, usually implementing the framework's APIs. The hardware may be, for example, a CPU or a combination of a CPU and a dedicated hardware accelerator, also known as a deep learning accelerator (DLA). The DLA may be, for example, GPU, ASIC, or FPGA devices.

Although the DLA computation is typically implemented in hardware, the management and control of the computations are performed in software. In an architecture that includes several dedicated hardware (HW) accelerators, there specifically is an increased need to manage and control the tasks to be executed by the different accelerators. The management and control tasks are typically performed by a set of software processes that is responsible for various functions such as multiple task queue management, scheduling of tasks, interfacing drivers, controlling the hardware programming model, and so on. As such, the functionality and the performance of the entire DLA's architecture are sometimes limited by the host CPU running these processes in software.

To better utilize AI compute resources in the cloud and in enterprise data centers, a disaggregation approach is utilized. Here, primary compute resources and AI compute resources are logically and physically disaggregated and located in separate locations in the data center. This allows a dynamic orchestration of the virtual machines executing AI applications on primary compute servers, as well as the AI compute resources running AI tasks on AI servers. AI tasks include, for example, machine learning, deep learning, and neural network processing tasks. For various types of applications an AI task includes, for example, natural language processing (NLP), voice processing, image processing, and video processing, with various usage models, for example, recommendation, classification, prediction, and detection. In addition, tasks can also include preprocessing and postprocessing computation, for example, image (peg) decoding, non-maximum suppression (NMS) after object detection, and the like.

As compute resources are disaggregated, and data centers are being distributed, the communication between the various resources is now a performance bottleneck as communication is still performed by traditional protocols, such as HTTP over TCP or gRPC (a recursive acronym for gRPC Remote Procedure Calls). This approach requires a high amount of CPU resources (e.g., due to the networking software stack and the networking drivers) and adds redundant latency to the processing pipeline.

The traditional communication protocols are not designed to support AI computing tasks. As such, data centers designed to support AI compute resources cannot be fully optimized to accelerate the execution of AI tasks, due to latency and low performance of the traditional communication protocols, which are not optimized to support AI compute tasks to the clients. An optimized protocol is aware of the AI tasks communicating and increases the efficiency of the primary/AI disaggregation in terms of latency, performance, power, and overhead as well as introducing end-to-end quality of service features such as service level agreement (SLA) based communication, load balancing, and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for data transport of artificial intelligence (AI) tasks between AI resources. The method includes establishing a connection between an AI client and an AI server with a storage element capabilities; encapsulating a request to process an AI task in a command capsule compliant with a storage data transfer protocol, wherein the command capsule is encapsulated at the AI client; and transporting the command.

Some embodiments disclosed herein include a system for system for data transport of artificial intelligence (AI) tasks between AI resources. The system includes a processing circuitry; and a memory, the memory containing instructions that, when executed by the processing circuitry, configure the system to: establish a connection between an AI client and an AI server with a storage element capabilities; encapsulate a request to process an AI task in a command capsule compliant with a storage data transfer protocol, wherein the command capsule is encapsulated at the AI client; and transport the command capsule to an AI server over a transport link using the storage data transfer protocol.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosure will be apparent from the following detailed description taken in conjunction with the accompanying drawings.

SUMMARY

Figure 1:
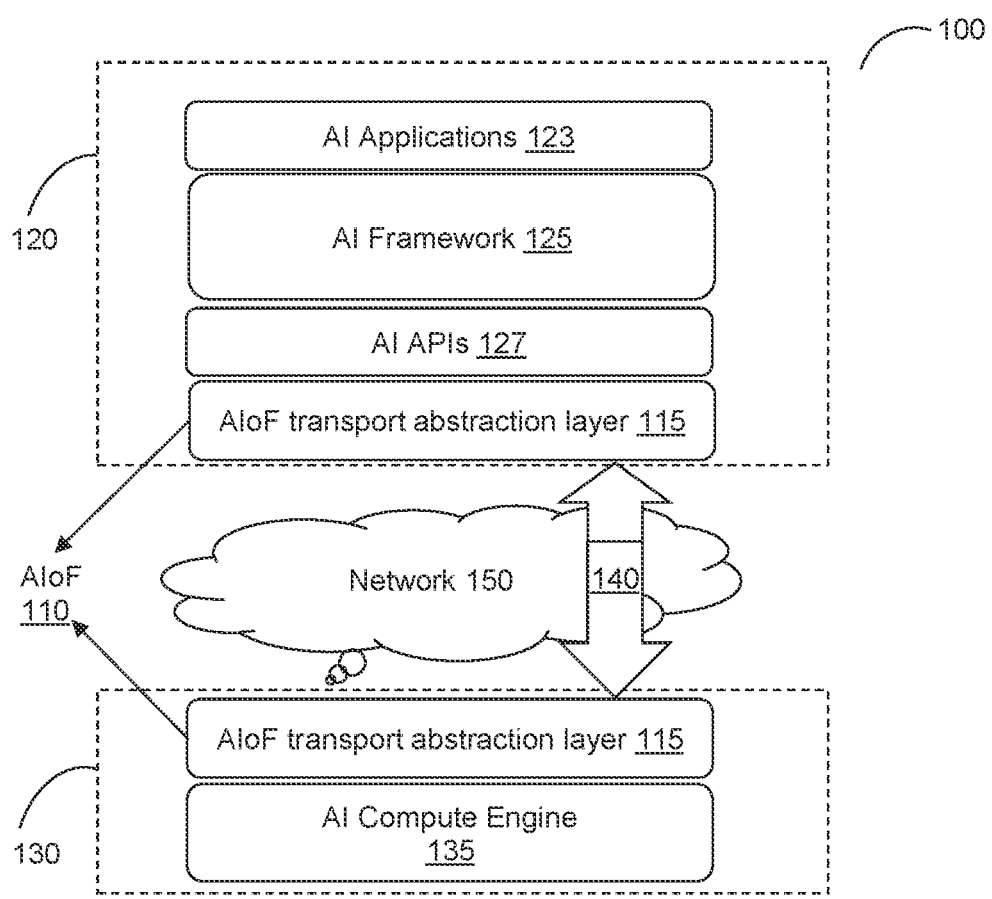
FIG. 1 is a block diagram illustrating the communication facilitated by an AI over Fabric (AIoF) protocol according to an embodiment.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like, numerals refer to like parts through several views.

The various disclosed embodiments include a communication protocol for high performance, low latency, and low overhead connectivity between artificial intelligence (AI) compute resources over a high-speed network fabric. The disclosed communication protocol is referred to hereinafter as "AI over Fabric protocol" or "AIoF protocol".

The disclosed AIoF protocol enables standardized communication among several compute resources, including, but not limited to, a server and a client that respectively perform or respond to the execution of AI computing tasks. A server may include an AI primary compute server hosting AI applications or other applications, and the AI compute server executes AI tasks (or simply an AI task or AI job). A client may include any application or object utilizing an AI server for AI tasks offload. AI tasks include, for example, machine learning, deep learning, and neural network processing tasks. For various types of applications an AI task includes, for example, natural language processing (NLP), voice processing, image processing, and video processing, with various usage models, for example, recommendation, classification, prediction, and detection. In addition, tasks can also include preprocessing and postprocessing computation, for example, image (jpeg) decoding, non-maximum suppression (NMS) after object detection, and the like.

The purpose of the AIoF protocol is to define alternative communication connectivity to a conventional processing protocol designed to remove processing overheads and any associated latency. In an embodiment, the AIoF protocol is operable as a mediator between AI frameworks and AI computation engines. The AIoF protocol transmits and receives data frames over standard transport-layer protocols, such as remote direct memory access (RDMA) or Transmission Control Protocol (TCP). An example of such AIoF protocol is described in more detail in U.S. patent Ser. No. 17/387,536 to Tanach et al. assigned to the common assignee, the contents of which are hereby incorporated by reference.

More particularly, the AIoF protocol may be implemented through a Non-Volatile Memory Express over Fabric (NVMeoF™) protocol, which provides access to a remote NVM controller through a fabric media. The NVMeoF™ protocol maintains the Non-Volatile Memory Express (NVMe) base protocol, only deviating to support data transport over the general fabric to allow access to remote controllers through the fabric. The NVMe™ protocol over fabric further enables non-volatile memory express commands that transfer data between a host and a storage element (e.g., SSD) over a networked fabric. Such storage element can be part of an AI server, or the AI server can be connected to the storage element.

In summary, the NVMeoF™ protocol utilizes a data structure, called a capsule, to transfer data. A capsule is an NVMe unit of information exchanged in NVMe over a fabric. A capsule may be classified as a command capsule or a response capsule. A command capsule contains a command (formatted as a submission queue entry) and may optionally include Scatter Gather Lists (SGLs) or data. The recent specification, revision 1.1, of the NVMeoF™ protocol was published on Jul. 12, 2021 while the first revision was published in June 2016. The specification of NVMeoF™ protocol is also described in the NVM Express® base specification revision 2.0 published Jul. 23, 2021.

According to some embodiments, implementation of AIoF over NVMeoF™ provides advantages of using known standards of the NVMeoF™, only modified, adapted to the specific usage model of the AIoF protocol and enforcing standardization for the host and end point to obey this protocol. In comparison to underlying protocols of RDMA and TCP, the NVMeoF™ protocol includes a more complete application specification, and contains schemes for management, authentication, and security. Furthermore, the implementation of AIoF over NVMeoF™ allows the use of preexisting client-side NVMeoF™ drivers.

The NVMe enables access to a storage NVM device through an NVMe controller. An unmodified NVMe operation is performed with a host submitting commands that include tasks for reading, writing, verifying, and the like, to a submission queue and the controller at the device side executing these tasks. The NVMe controller is also responsible for data access and submits completion queues when the task is complete. NVMeoF supports RDMA, Fibre Channel, and TCP fabrics. The protocol includes commands for discovery, initialization, and configuration. NVMeoF™ extends this functionality with commands to manage the fabric.

The disclosed embodiments may further adopt computational storage (CS) architecture to the NVMeoF™ protocol that allows offloading of an execution of a program from the host to the controller side. In such a scenario, an NVMeoF™ channel is capable of data storage, I/O operations of read and write, as well as providing additional channel commands including CS-specific commands to address computational elements for management and configurations, such as loading a program or executing a program.

The CS provides a framework for discovering, configuring, and executing programs. For an AIoF extension, the AI task will be a CS program sent to be executed on the storage elements, and may be sent with an execution command or handled on the local data in the storage. In such a scenario, the AI client may be of the host and the AI server may be the NVMe controller of the computational entity behind that part. While the NVMeoF defines a point-to-point communication between a single host and a single controller, the AI server may be working with multiple clients. With each of them, the AI establishes a connection and can communicate with the AIoF protocol.

FIG. 1 shows an example diagram 100 illustrating the communication facilitated by the AIoF protocol according to an embodiment.

The AIoF protocol 110 is configured to facilitate the communication between an AI client 120 and an AI server 130. The AI client 120 is an application, an object, and/or device utilizing the AI server 130 to offload AI tasks. The AI server 130 is an application, object, and/or device serving the AI client 120 by offloading AI task requests and responding with results. It should be noted that the AI client 120, the AI server 130, or both, can be realized in software, firmware, middleware, hardware, or any combination thereof.

Typically, the AI client 120 may include a runtime framework 125 to execute AI applications 123. The framework 125 may be realized using technologies including, but not limited to, TensorFlow, Caffe2, Glow, and the like, all standardized AI frameworks or any proprietary AI framework. The AI client 120 is also configured with a set of AI APIs 127 to support standardized communication with the AI compute engine 135 at the AI server 130.

The disclosed AIoF protocol 110 is a communication protocol designed to support AI models' installations and AI operations (collectively may be referred to as AI computing tasks). The AIoF protocol 110 is configured to remove the overhead of a transport protocol, latency issues, and the multiple data copies required to transfer data between the AI client 120 and server 130.

In an embodiment, the AIoF protocol 110 is configured using a shared memory over a network, in which the application can use its memory while the hardware transparently copies the AI model or the data from the application memory to a network-attached artificial intelligence accelerator (NA-AIA) memory via the network.

According to the disclosed embodiments, the AIoF protocol 110 includes a transport abstraction layer 115 configured as part of the AI client 120 and server 130. The abstraction layer 115 is configured to fragment and de-fragment AIoF data frames respectively transmitted and received over a transport protocol 140. The format of an AIoF data frame is discussed in detail below.

Typically, the transport protocol 140 is responsible for data integrity and retransmission in case of congestion of the link and its queues. In a further embodiment, the AIoF protocol 110 controls the integrity of the AI Task execution and contains flow control and credit information that is exchanged between endpoints to control scheduling and availability of AI compute resources.

Different transport protocols are supported by the disclosed embodiments. In a preferred embodiment, the transport protocol is the NVMe. In other configurations, the transport protocol may include a Transmission Control Protocol (TCP), a remote direct memory access (RDMA), a RDMA over converged Ethernet (RoCE), InfiniBand, and the like. The communication between the AI client 120 and AI server 130 is over a network 150. The network 150 includes a collection of interconnection switches (not shown) allowing the connectivity between the AI client 120 and the AI server 130. In an example configuration, the switches may include, for example, Ethernet switches. The network 150 may be a local area network (LAN), a wide area network (WAN), a metropolitan area network (MAN), and the like. The physical medium may be either a wired or wireless medium. Typically, when deployed in a datacenter the wired medium is a copper wire or an optical fiber.

The transport abstraction layers 115 of the AIoF protocol may support multiple communication channels to support the transfer of various types of data and the priority of its data. A channel includes a separate header and control demarcations, and separate state of operation and flow control credit related to the channel, A channel can have separate data format and separate queues. As such, it is possible to carry a certain type of AI task traffic separately with an isolated manner over that channel.

In NVMeoF, the transfer of the data can occur in the native NVMeoF protocol itself. As such, data is not carried in a specific AIoF data channel, as such channel just includes the exchange of AI task information (Request/Response) that controls the data exchange and the task execution, encapsulated within the NVMeoF protocol.

Figure 2:
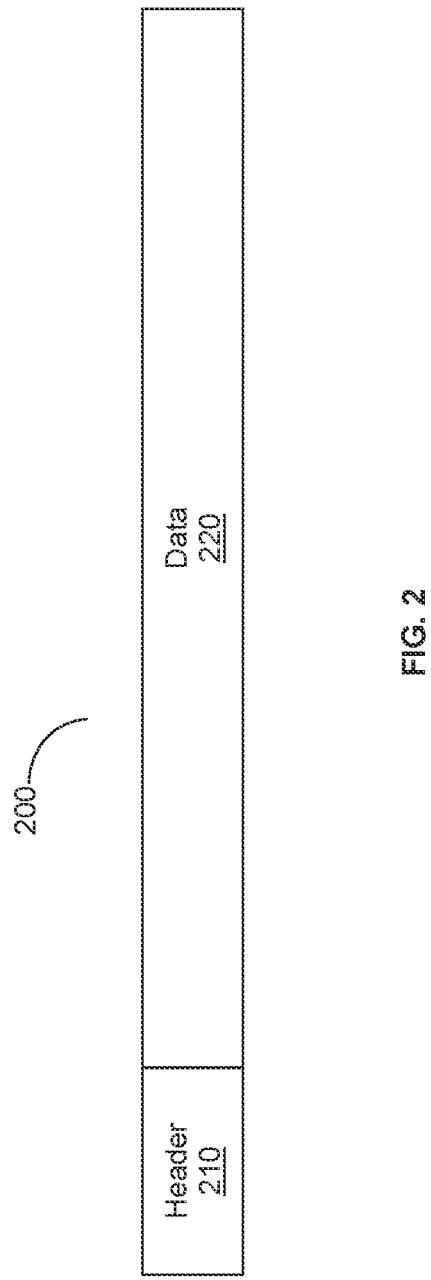
FIG. 2 is a diagram of an AIoF data frame structured by AIoF according to an embodiment.

FIG. 2 shows an example diagram of an AIoF data frame 200 structured by AIoF according to an embodiment. The AIoF data frame 200 complies with the AIoF protocol and is being utilized to transfer data of AI tasks, and results thereof. In an embodiment, AI tasks are fragmented and transferred over one or more channels supported by the AIoF protocol. In an embodiment, the frame 200 is generated and processed by a transport abstraction layer (e.g., layer 115, FIG. 1) of the AIoF protocol.

The AIoF data frame 200 includes a header portion 210 and a payload portion 220. The payload portion 220 is structured to carry the data to run a specific AI task. For example, the AI task may include an image processing, then the data would be the image to be processed.

The header portion 210 includes a number of optional fields designating, in part, the AI task type, the length of the payload data, a source address (or identifier), and a destination address (or identifier). The header includes the metadata information of the AI task, including elements that are required for the processing of the AIoF frame and the AI task, channel types, information like identifier to the task and its sources, addresses for descriptors, task characteristics like model ID.

AIoF data frame 200 is transported over a transport protocol, examples of which are provided above. When transported over a transport protocol (layer), the AIoF data frame 200 is fragmented into a number of consecutive transport layer packets, where the fragments of the AIoF frame is included in the payload portion of the transport layer packets.

In an embodiment, the format of the AIoF data frame 200 can be adaptative. That is, the frame may be modified with different header fields, a header size, a payload size, and the like, or combination thereof, to support different AI frameworks or applications. In an embodiment, the format of the data frame is negotiated, during an initialization handshake (or a discovery mode) between the AI client and server.

In one configuration, several predefined formats are defined by the AIoF protocol. The version of the format can also be for a specific task, or batch of tasks. In general, this flexible format can be deduced to a specific format that is selected between the two endpoints according to their capabilities, and the specific task that is currently processed.

AIoF data frames 200 are transported by means of the NVMeoF™ protocol, and to this end, an AIoF frame may be encapsulated in an NVMeoF™ capsule. An NVMeoF command capsule carries a command and may carry data. As noted above, a capsule is an NVMe unit of information exchange used in NVMe over a fabric. A capsule may be classified as a command capsule or a response capsule. A command capsule contains a command (formatted as a submission queue entry) and may optionally include SGLs or data. That is, a command is sent by a host to the controller. A command can be controlled or also carry data.

Figures 3A, 3B:
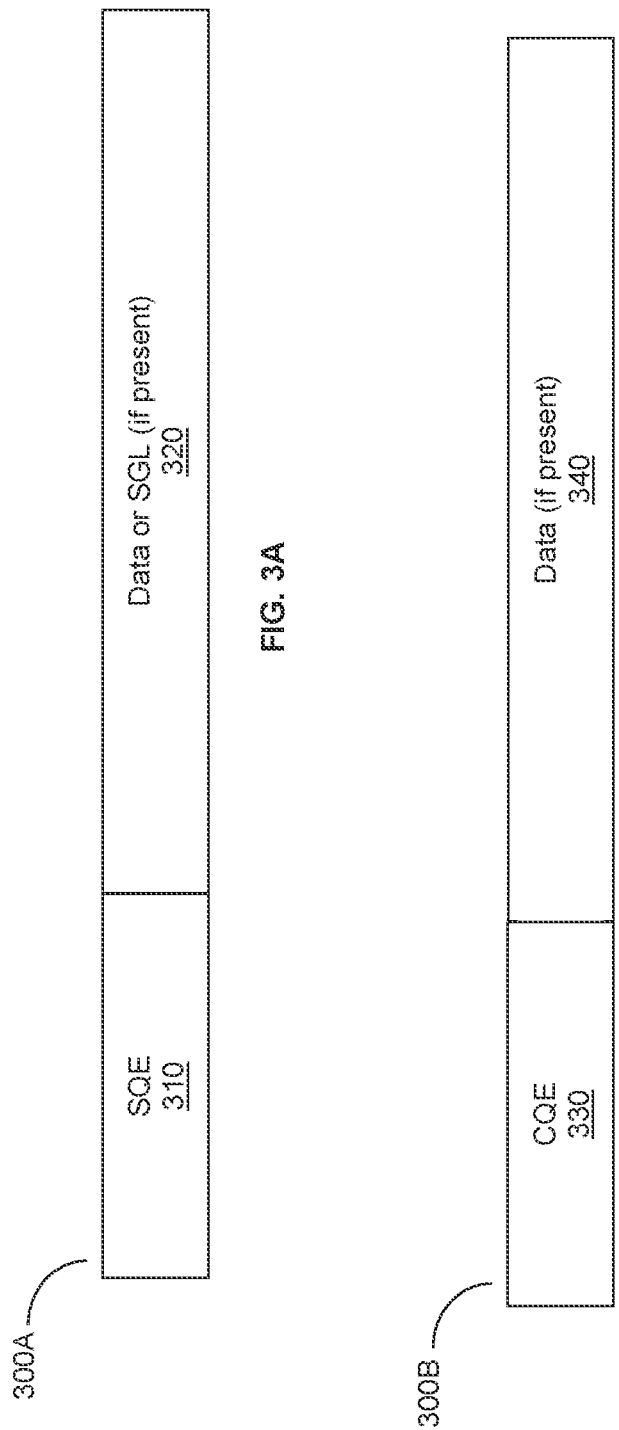
FIG. 3A is a diagram of a Non-Volatile Memory express over Fabric (NVMeoF) command capsule according to an embodiment.
FIG. 3B is a diagram of an NVMeoF command capsule with an AIoF data frame according to an embodiment.

FIG. 3A shows a diagram of a command capsule 300A utilized to carry AIoF information according to an embodiment. The command capsule 300A is structured according to the specification of the NVMeoF protocol. The AIoF information in the NVMeoF capsule 300A, complies with the AIoF over NVMeoF™ protocol and is being utilized to transfer data of AI tasks, and results thereof. The capsule contains a command or response, and may optionally contain data or Scatter Gather Lists (SGLs).

The command capsule 300A is sent from a host to a controller. The command capsule 300A contains a Submission Queue Entry (SQE) in a field 310 and a data portion 320. The data portion 320 may optionally contain data or SGLs. The SQE is 64 bytes in size and contains the admin command, I/O command, or Fabrics command to be executed.

A command identifier field in the SQE is unique among all outstanding commands associated with that queue. To transfer data or additional SGLs within the capsule, the SGL descriptor in the SQE contains a data block segment description, or the last segment descriptor specifying an appropriate offset address.

In an embodiment, an AIoF frame may be encapsulated in a command capsule 300A. Specifically, a request to execute an AI task may be embedded in the SQE, while data associated with the AI request can be included in data portion 320, In an embodiment, such data of the AI task can be retrieved from a host (in the AI client) by designated the addresses of such may be included in the Scatter Gather Lists (SGLs). The AI request itself can also be identified by a regular NVMe command access to a specific designated address reserved for AI command and response indications.

In another embodiment, a computational storage (CS) may be implemented in the NVMeoF protocol to define new commands for AIoF messages. Such commands may have their own headers and data attached to them and define special NVMe (which may also be NVMeoF) commands that are directed to the computational elements. Such new commands define three stages: discovery, configuration, and operation, where the computational graph (CG) is discovered at the discovery stage, and a running program (CG) and parameters are loaded at the configuration state. The AI task, for example, inference or training, is executed in the operational stage of the AI functions according to the AIoF protocol defined above.

In an embodiment, a connect command may be used to create an administrator (Admin) or I/O queue, which may be used to set a link for AIoF QPs in the AIoF protocol. The NVMeoF protocol does not support the Admin commands associated with the I/O queue creation and deletion defined in the NVMe base specification. The connect command specifies the Queue ID and type (Admin or I/O), the size of the submission and completion queues, queue attributes, host NQN, NVM subsystem NQN, and the host identified. In addition, the connect command may specify a particular controller if the NVM subsystem supports a static controller model. The connect response indicates the successfully establishment of connection as well as the requirement of the NVMe in-band authentication.

FIG. 3B shows an example diagram of a response capsule 300B utilized to carry AIoF information according to an embodiment. The response capsule 300A is structured according to the specification of the NVMeoF protocol. The AIoF data frame carrying results of execution of AI tasks are encapsuled in a response capsule 300B according to an embodiment. The AIoF information in the response capsule 300B complies with the AIoF over NVMeoF™ protocol.

The response capsule 300B shown in FIG. 3B is sent from a controller to a host. The response capsule 300B a completion queue entry (CQE) field 330 and may optionally contain data in the data portion 340, such as an AIoF response. The COE is the completion entry associated with a previously issued command capsule. Data is included in the response capsule when the command capsule requests data, and the SGL in the associated command capsule specifies a data block descriptor with an offset. Data may be transferred via a memory transaction when the SGLs in the command capsule specify a region in the host memory. The data may be transferred within capsules or by memory transfers as specified by the SGL. The SGLs may be used to specify the location of data. Metadata, if transferred, is a contiguous part of the logical block with which that metadata is associated.

Figure 4:
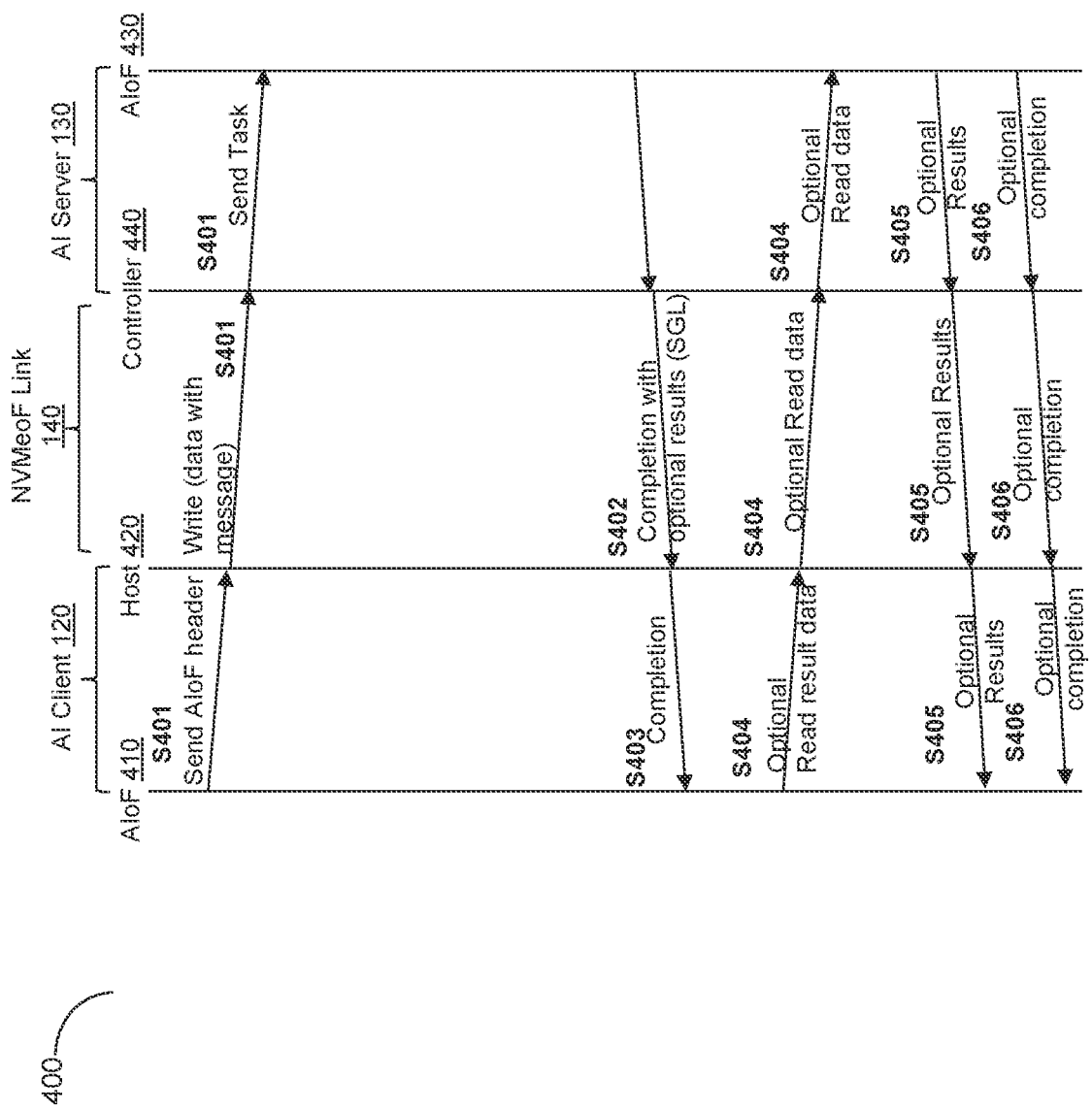
FIG. 4 is a flow diagram illustrating a data flow between an AI client and an AI server using the AIoF-NVMeoF protocol according to an example embodiment.

FIG. 4 is an example flow diagram 400 illustrating a data flow between an AI client 120 and an AI server 130 using the AIoF-NVMeoF protocol according to an example embodiment. In the example shown in FIG. 4, the transport may be over an NVMeoF link 140 including, but not limited to, RDMA and TCP transport layers. In an embodiment, the AI client 120 may include an AIoF component 410 and a host 420 to initiate AI tasks which may be transferred to the AI server 130 side that includes an AIoF component 430 and a controller 440. In an embodiment, the host 420 and controller 440 may be components of the NVMeoF protocol. The host 420 and controller 440 encapsulate AIoF frames in NVMeoF capsules to be transported over the link 140.

It should be noted that the AIoF, host, NVMeoF link, and controller components may include software stacks and/or circuits to execute the various tasks related to the operation of the AIoF, and NVMeoF protocol. The AIoF components (either 410 or 430) implement the abstraction layer (e.g., layer 115, FIG. 1).

The transport protocol of the NVMeoF link 140 provides the ability to access (read, write) memory on a remote system (e.g., AI client or server) without interrupting the processing of the CPUs on that system. There are a number of transfer commands in RDMA. These commands include, for example, SEND—a request to send data, WRITE—write data into a remote (virtual) memory, and READ—read data out of the remote (virtual) memory. These commands are used when the AIoF is carried over RDMA.

In an embodiment, when using TCP/IP packets, the AIoF data frames are carried over Ethernet SEND/RECEIVE packets, encapsulated over TCP/IP, in addition to the regular TCP/IP message protocols. In this embodiment, the handshake can also be implemented over layer-7 protocols, such as HTTP or HTTP2, where the messages will be encapsulated over the framing of these protocols.

In an embodiment, the AIoF headers may be written to specific reserved addresses and the AIoF data may be written to addresses allocated for data, which is an AIoF task data reserved range that will be used by the AI server 130 to store the AI task data. The transport operation over the transport protocol involves the server 130 reading data from the client 120. In this case, no additional AIoF command is added to the protocol.

At S401, an AIoF frame is sent from the AI client 120 to the AI server 130 over the transport link 140, such as an NVMeoF link. The AIoF data frame may include a request to execute an AI task. In an embodiment, the host 420 encapsulates the AIoF frame in one or more command capsules having a format defined by a storage data transfer protocol. Such a protocol may include an NVMeoF protocol and the format or structure of such a command capsule is shown in FIG. 3A.

The AIoF request headers may be included in the data portion of the capsule reserving the NVMeoF message header for the NVMeoF channel requirements. Specifically, the command capsule is sent from the host 420 to the controller 440 encapsulating a request to process an AI task. The request is generated by the AIoF element 410 at the AI client 120, and such a request is included in an AIoF frame (or at least at its header portion). The header portion of the AIoF frame designates at least the type of the AI task. It can also be indicated by writing to a specific reserved address.

The AIoF headers of an AIoF frame are either provided in the command or written to specific reserved addresses. The AIoF data is written to addresses allocated for the data, which is an AIoF's task data reserved range that will be used by the server to store the AI task data. As the AI client initiates the tasks, it will implement the host side of the NVMeoF protocol. The AI server 140 will implement the NVMeoF target controller 400.

The host 420 either provided in the command or writes the AIoF headers to specific reserved addresses at the controller 440, while the AIoF data are written to addresses allocated for the data, which is an AIoF task data reserved range that will be used by the AI server to store the AI task data. In an embodiment, data associated with the AI task requested to be executed in sent in a NVMeoF capsule designed to send data in a special command or in a data read/write command to a specific data reserved range.

In response, to the completion of the execution of AI task, at S402, a header completion operation for the AI task request is sent from the AI server 130 to the AI client 120 when the results are ready. In an embodiment, the results may be forwarded to another server (not shown) for further computation. However, it should be noted that the completion here is for receiving the data (results) and not for finishing the AI task. The completion message together with the results (if available) are encapsulated in response capsules and sent over the NVMeoF link. In an embodiment, the capsule in a format shown in FIG. 3B can be utilized to transfer the response from the controller 440 to the host 420. Here, the response capsules include a completion queue entry (CQE) and the execution results may be optionally obtained in the data portion (320, FIG. 3B) such as an AIoF response.

In an embodiment, execution results are provided in a completion of the execution of the AI task. To this end, completion of the task data write should be delayed until the AI task is completed. In another embodiment, a completion message is initiated as a read where data should be pulled by the host 420. A memory range is reserved at the host 420 to indicate if the task is completed. The host 420 can query/read this field from time to time to check if the task is performed. The read of the execution results may be performed as part of the data transfer (like RDMA write or TCP C2HData) or in a separate read after the completion of the execution (e.g., as performed in the current suggestion of CS).

At S403, a completion operation is provided when the results are ready from the AI server 130 to the AI client 120. The result of such an operation is the first option for providing completion data, which should be delayed until the AI task is complete. In another optional embodiment, the completion of data initiates an operation to read result data where data should be pulled by the client, as shown in S404. There may be a memory range to indicate completion of the task. In addition, the AI client 120 may read data intermittently to check if the task is performed.

At 8405, the resulting data of the completed task is transferred from the AI server 130 to the AI client 120. Then, at S406, the completion operation is transferred from the AI server 130 to the AI client 120. S405 and 8406 are optional.

The AIoF request may be transmitted in a write operation over the submission queue. The transaction completion may be provided and received at the completion queue. Furthermore, the AIoF data may be provide in a separate write data transaction and results may be provided with a separate read data transaction. Such transaction may be performed without waiting for completion of previous completion if a credit is present. SGLs are used to specify the location of data at the host 420.

In an embodiment, two links to support the server-to-server concatenation may be configured. In such a configuration, NVMe transactions may be initiated to get the data for the AI task from a remote storage. If a shared memory address is present, the host address for reading the data can point to a different host.

The AIoF, host, and controller components may be implemented in software, firmware, middleware, hardware, or any configuration thereof. Further, such components can be realized as virtual software including entities software container, virtual machines, microservices, and the like. In an embodiment, the AIoF component be integrated in a network interface card (NIC) included in the server or client. Such integration can be achieved using a protocol software or firmware driver. The disclosed embodiment may be modified to include a computational storage (CS) component to the NVMeoF protocol.

The implementation of CS to the AIoF over NVMeoF protocol does not deviate from the scope of the disclosure. The protocol handshakes of the AIoF remain the same as the examples shown in FIG. 4. AIoF is provided as part of the NVMe CS support and therefore may be carried on any of the NVMe media including the NVMeoF links of RDMA/RoCE and TCP/IP.

Figure 5:
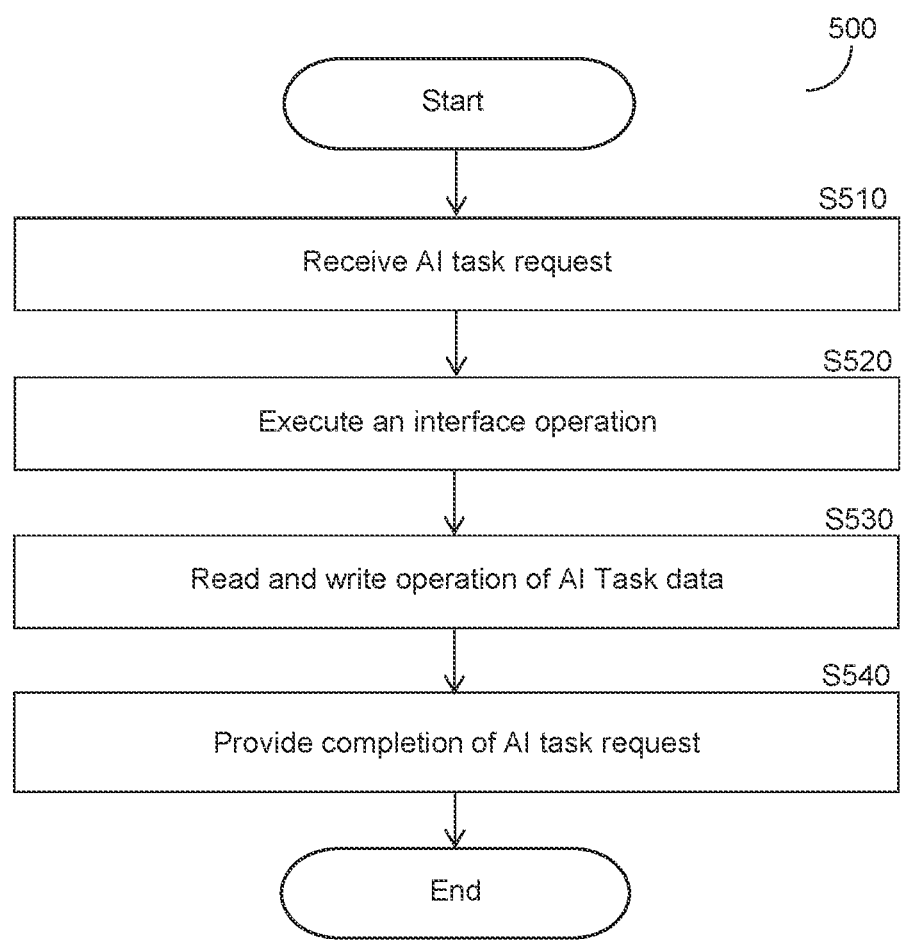
FIG. 5 is a flowchart illustrating a method for data transport using an AIoF over computational storage NVMe protocol according to another example embodiment.

FIG. 5 is an example flowchart 500 illustrating a method for data transport using an AIoF over computational storage NVMe according to an example embodiment. In an example embodiment, the same NVMe CS command may be used and further expanded to include AIoF header information. The AI CG may be equivalent to an executable program and the execution of the program will be translated to an execution of an AI job, for example, inference or training, operation, meaning translation to an AIoF job request operation. The request does not include the AI CG. The method is performed by the AI server 130. The AIoF commands use special CS commands to provide the AIoF exchange protocol.

At S510, an AI task request together with the data associated with the request is received. The AI task may include, for example, inference or training. At S520, an operation of the AI Task designated in the received request is executed by translation, and execution of a program.

At S530, the operation of an AI Task's data is read from and then written to a remote memory. The memory may be over a network, in which the application can use its memory while the hardware transparently copies the data from the application memory to a network-attached artificial intelligence accelerator (NA-AIA) memory via the network.

At S540, a result response is provided. In an embodiment, the response may be provided as the completion of an AI task request. In another embodiment, the response may be replaced with an asynchronous message for completion of the execution of the AI task. Optionally, S540 may include transferring and processing results from server 130 to client 120.

In another embodiment, specific AIoF commands may be added in addition to the NVMe base command specification and to the NVMe CS extensions. Some examples of additional AIoF commands are shown in Table 1. It should be noted that a significant deviation from the CS command format may include the ability to have data movement with the below AI Task request command (for request and completion/response).

TABLE 1

Load a CG
AI Task request (Execute a CG with or without writing of the data)
Completion of this command provide the AI task response message
Read from memory
Write to memory
Get/Set CG slot information
Get/Set Memory information In a CS, the execution program completion indicates the completion of the execution of the program and not just finishing to pass the data like regular NVMe access for storage. Such execution may be performed on local data by indicating the memory region. Loading and unloading a CG may be equivalent to loading/unloading of the executable program where message may be reused in the same context. In another embodiment, the execution is performed on a compute memory, where the data was written to the compute memory either from local storage or from host storage before the execution command.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination: A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for data transport of artificial intelligence (AI) tasks between AI resources, comprising:
    establishing a connection between an AI client and an AI server with a storage element capabilities;
    encapsulating a request to process an AI task in a command capsule compliant with a storage data transfer protocol, wherein the command capsule is encapsulated at the AI client; and
    transporting the command capsule to an AI server over a transport link using the storage data transfer protocol.

2. The method of claim 1, further comprising:
    encapsulating a response to the request to process the AI task in a response capsule compliant with the storage data transfer protocol, wherein the response capsule is encapsulated at the AI server; and
    transporting the response capsule to the AI client over the transport link using the storage data transfer protocol, wherein a structure of the command capsule is different from a structure of the response capsule.

3. The method of claim 2, wherein the storage data transfer protocol is a NVMeoF protocol.

4. The method of claim 3, wherein the AI client contains a host and the AI server contains an NVMe controller.

5. The method of claim 4, wherein the command capsule is encapsulated by the host and read by the NVMe controller.

6. The method of claim 4, wherein the response capsule is encapsulated by the NVMe controller and sent to the host.

7. The method of claim 1, further comprising:
forming an AI data frame including the request, wherein the AI data frame is compliant with a communication protocol that is different from the storage data transfer protocol.

8. The method of claim 7, further comprising:
transporting the AI data frame using any one of: a read command and a write command of the storage data transfer protocol.

9. The method of claim 8, further comprising: transporting the AI data frame by accessing specific reserved data addresses defined by the storage data transfer protocol.

10. The method of claim 7, wherein the AI data frame includes a header portion and a payload portion, wherein the payload portion is structured to carry the data to process the AI task.

11. The method of claim 8, further comprising:
fragmenting the AI data frame into consecutive transport protocol packets; and
encapsulating the resulting fragments of the AI data frame in payload portions of NVMeoF capsules.

12. The method of claim 1, further comprising:
encapsulating a load computational graph (CG) in a command capsule, wherein the CG causes loading of a computational storage (CS) program; and
encapsulating an AI task request in the command capsule to cause execution of the CS program.

13. The method of claim 12, wherein the AI task request to cause execution of the CS program defines an execution stage of the CS program, wherein the execution stage include: a discovery stage, a configuration stage, and an operation stage.

14. The method of claim 13, wherein the CS program is any one of: load a computational graph, execute a computational graph, read from a memory, write to a memory, get memory information, and get computational graph slot information.

15. The method of claim 1, wherein a physical medium of a network is at least a fabric.

16. A non-transitory computer readable medium having stored thereon instructions for causing a processing circuitry to execute the method of claim 1.

17. A system for data transport of artificial intelligence (AI) tasks between AI resources, comprising, comprising:
a processing circuitry; and
a memory, the memory containing instructions that, when executed by the processing circuitry, configure the system to:
establish a connection between an AI client and an AI server with a storage element capabilities;
encapsulate a request to process an AI task in a command capsule compliant with a storage data transfer protocol, wherein the command capsule is encapsulated at the AI client; and
transport the command capsule to an AI server over a transport link using the storage data transfer protocol.

* * * * *